JNO. HUGHES.
Machine for
PICKING COTTON BOLLS.

No. 113170

Patented Mar 28 1871

Witnesses.
Villette Anderson
Frank B. Curtis

Inventor.
John Hughes
Chipman Hosmer & Co
Attys,

United States Patent Office.

JOHN HUGHES, OF NEW BERNE, NORTH CAROLINA.

Letters Patent No. 113,170, dated March 28, 1871.

IMPROVEMENT IN COTTON-PICKERS.

The Schedule referred to in these Letters Patent and making part of the same.

*To all whom it may concern:*

Be it known that I, JOHN HUGHES, of New Berne, in the county of Craven and State of North Carolina, have invented a new and valuable improvement in Machines for Picking Cotton-Bolls; and I do hereby declare that the following is a full, clear, and exact description of the construction and operation of the same, reference being had to the annexed drawing making a part of this specification, and to the letters and figures of reference marked thereon—

Figure 1 of the drawing is a representation of a vertical section through the line $x\,x$.

Figure 1:
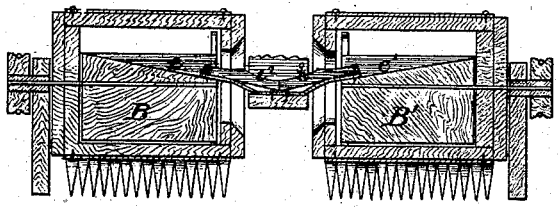
Figure 2:
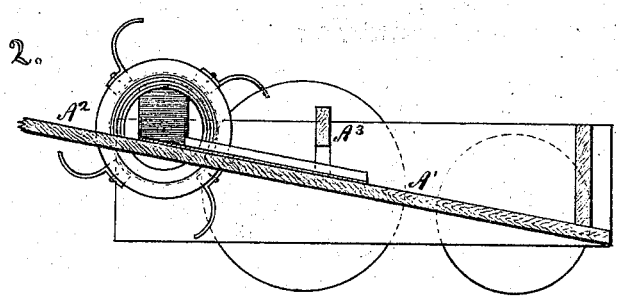
Figure 2 is a central vertical longitudinal section through the line $y\,y$.
Figure 3:
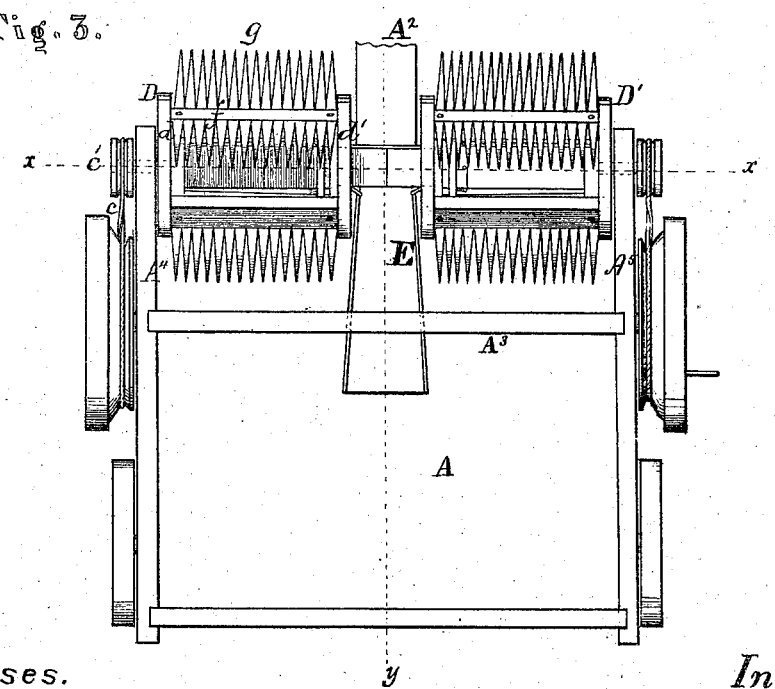
Figure 3 is a top view.

This invention has reference to machines for gathering cotton and cotton-bolls from the plants in the field; and it consists in the construction, for that purpose, of some novel devices, and a combination of devices, hereinafter fully described, the object being the production of a machine for the automatic picking of cotton and cotton-bolls as it is drawn over the plants as they stand in rows or otherwise in the field.

Referring to the accompanying drawing—

A represents a kind of a wagon well suited for the use intended; it has a slanting bottom $A^1$, from which projects a support in front, $A^2$.

The bottom $A^1$ and the support $A^2$ may be raised or lowered by means of the side of the box $A^3$, which slides in a groove, so as to raise or lower the inner ends of the cylinders B and B', which rest upon the support $A^2$ and the projecting ends of the box A, denoted by $A^4$ and $A^5$, which also should have provision for raising and lowering the outer ends of the cylinders B and B', this adjustment of the cylinders being necessary to adapt the machine to the condition of the ground and the plants.

The wagon is provided with four wheels, as shown, designated by C, $C^1$, $C^2$, and $C^4$, all of which serve for carrying the box and machinery; and the two, C and $C^1$, have grooves for the belt $c$, and serve as driving-pulleys for the cylindrical cases D and D', to which they communicate motion by means of the belt $c$ and pulley $c'$.

The cylinders B and B' are fixed by suitable means to the supports $A^2$, $A^4$, and $A^5$, and they have on their upper sides inclined channels or troughs inclined toward and open at their inner ends, which serve to conduct the gathered cotton and cotton-bolls to the trough E.

The channels or troughs $e$ and $e^1$ are lengthened by splices $e^2$ and $e^3$, so as to form a conduit through the inner ends of the cylindrical cases D and D'.

The cylindrical cases D and D' consist of the end-piece $d$, which is connected to the pulley $c'$, and the end-piece $d'$, which has an opening for the conduit, and the longitudinal bars or pieces $f$, of a suitable number, which connect the end-pieces $d$ and $d'$. This cylindrical case revolves around the fixed cylinder, the bars or pieces designated by $f$ sliding over its surface so as to sweep the cotton and cotton-bolls into the inclined channel in its upper side.

On the bars denoted by $f$ are fixed the combs $g$, which are formed and curved as shown, and which, as the cylindrical case revolves and the machine is drawn along over the cotton-plants, strips therefrom the cotton and cotton-bolls, in the manner of combing, and deposits them upon the cylinder, from which they are swept by the bars into the conduit and trough, and they pass into the wagon-box.

I do not wish to confine my invention to any certain number of cylinders, cylindrical cases, or combs, or to any exact form of wagon, as shown, as the machine may be constructed and adapted to a single or double team, and to the gathering or picking of one row or more at the same time, or be adapted to be used in connection with an ordinary cart or wagon.

This machine strips from the plants the unopen as well as the open bolls or cups, and loose cotton, which can afterward be separated by another machine for that purpose.

It saves much labor, prevents waste, and operates in an effectual manner.

I claim as my invention—

The combination of the cylindrical case D having combs $g$, cylinder B having inclined channel $e$ and spout $e^2$ opening into trough E, all constructed and arranged in relation to the wagon A, as shown, and for the purposes specified.

In testimony that I claim the above I have hereunto subscribed my name in the presence of two witnesses.

JNO. HUGHES.

Witnesses:
G. H. ROBERTS,
W. W. ROBERTS.